INVENTOR.
Manfred Quissek
BY
Pierce Schiffler & Parker
Attorney

United States Patent Office 3,529,404
Patented Sept. 22, 1970

3,529,404
CONTROL DEVICE FOR FEED SYSTEMS OF ELECTRO-FILTERS
Manfred Quissek, Villigen, Switzerland, assignor to Aktiengesellschaft Brown, Boveri & Cie, Baden Switzerland, a joint-stock company
Filed Aug. 27, 1968, Ser. No. 755,615
Claims priority, application Switzerland, Aug. 30, 1967, 12,161/67
Int. Cl. B03c 3/68
U.S. Cl. 55—105
4 Claims

ABSTRACT OF THE DISCLOSURE

An apparatus for regulating the voltage applied to an electrostatic precipitator to maintain the voltage close to the spark-over level, the apparatus having a voltage feed unit of silicon controlled rectifiers interposed between the precipitator and a voltage supply source, a signal generating device producing a first electrical output proportional to the instantaneous valve of the precipitator voltage, a plurality of integrating circuits having different time constants connected to receive the output of the signal generating device, a control device for controlling the firing of the silicon controlled rectifiers connected to said integrating circuits and receiving signals therefrom and controlling the firing of said silicon controlled rectifiers in response to the signals received from said integrating circuits.

---

Figure 1:
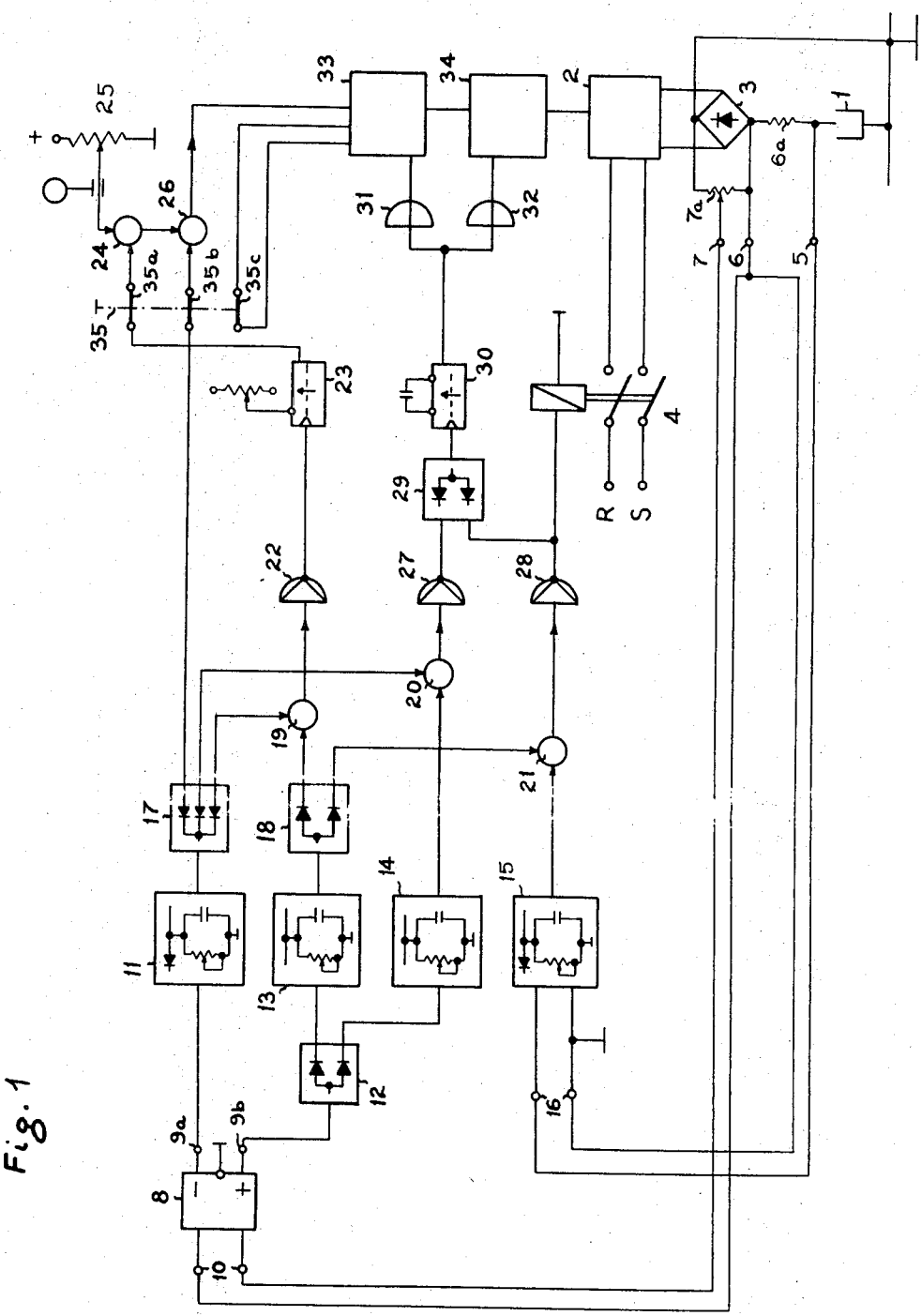

This invention relates to the art of electro-filters, i.e. those of the electrostatic type for precipitating dust from a moving air stream, and is more particularly directed to an improved regulating system for supplying the filter with a feed voltage which is maintained continuously close to the spark-over voltage.

In the operation of electrostatic air filters, it has been customary for some time to regulate the filter voltage so that an optimum degree of dust separation is achieved, even with great variations in the amount of dust to be removed. Since the degree of dust separation rises with an increase in filter voltage, while the spark-over voltage can be subject to great variations during filter operation, it becomes necessary to regulate the applied filter voltage in a continuous manner so that it always lies at a value close to but not yet reaching the spark-over voltage.

In order to obtain this mode of operation, a known arrangement for regulating the applied filter voltage in a manner corresponding to the determined filter impedance has been to derive two electric signals of opposite signs proportional to the measured, i.e. instantaneous values of the filter current and filter voltage which are so mixed that the mixed signal becomes zero for the regulated state and controls the necessary variation in the regulated state when predetermined threshold values are exceeded. It is assumed that the filter impedance varies only so slightly during operation of the filter that the above-mentioned threshold values are not exceeded in the resulting variation of the mixed signals.

This known arrangement has the disadvantage that the threshold values must be assumed so high, with the great but relatively slow variations of the filter impedance expected in operation, that the regulating device sometimes does not respond to weak electric arcs.

The principal object of the present invention is thus to provide an improved regulating system in which the aforesaid disadvantage is eliminated, and which enables the electrostatic filter to be operated continuously with the maximum possible filter efficiency independently of the momentary impedance of the filter.

The improved regulating system is characterized by a plurality of electric integrator circuits having different time-constants connected to the output of a measured value transformer, by which a filter voltage regulating device, controlled by the output signal of the integrator circuit with the longest time constant serving as the instantaneous value, controls the filter voltage regulating device in the sense of a correlated specific reduction of the filter voltage, by means of at least one comparator circuit which forms a mixed signal from the output signals from the integrator circuit having the longest time constant and from another integrator circuit, and by at least one time element connected to the output of the comparator by way of a threshold value switch, during its predetermined response time after a correlated interference threshold has been exceeded.

Figure 3:
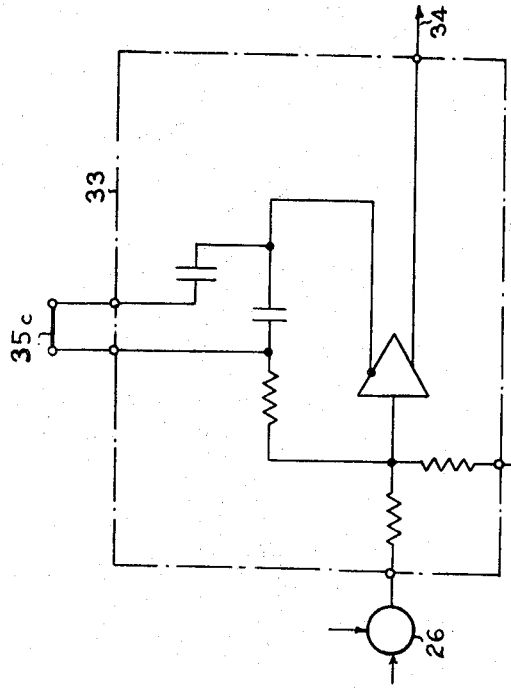
Figure 2:
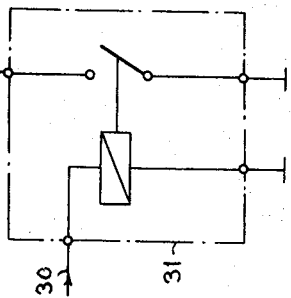
Figure 2:
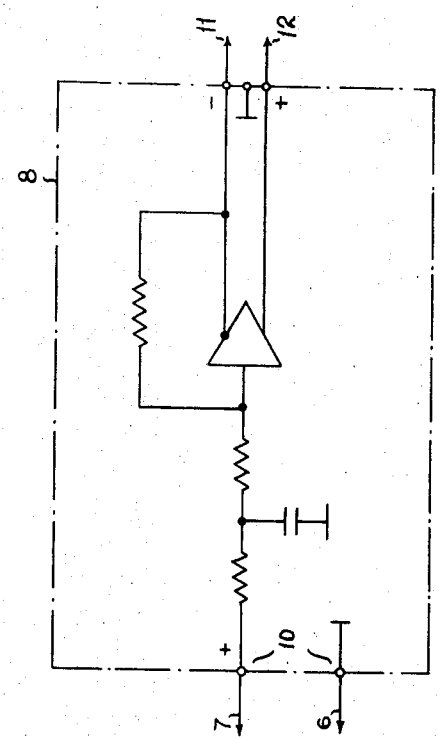
Figure 4:
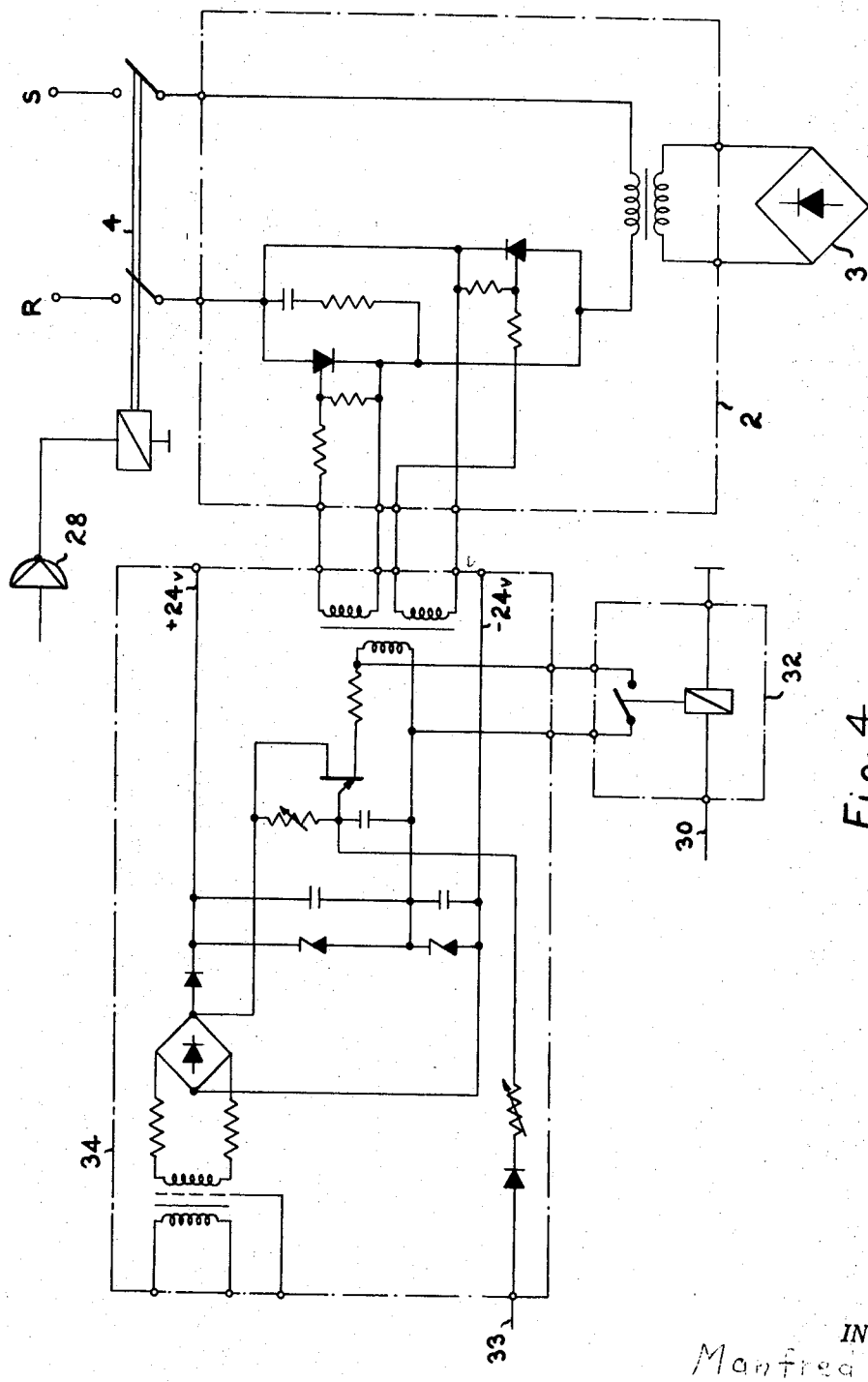

The foregoing as well as other objects and advantages inherent in the improved filter voltage regulating system will become more apparent from the following description of a preferred embodiment thereof and from the accompanying drawings wherein:

FIG. 1 is a block electrical schematic diagram illustrating the various components in the system and the manner in which they are interconnected and function to control the voltage applied to the electrostatic filter; and FIGS. 2, 3 and 4 are detailed circuit views of certain of the operating components which are shown in FIG. 1 only in block form.

With reference now to the drawings, an electrostatic filter of conventional construction is illustrated diagrammatically at 1, and receives its operating voltage from a feed unit 2, the alternating current output from the latter being converted to direct current in the rectifier 3 and then applied to the input terminals of the filter unit. The feed unit 2 functions in accordance with the phase cutting method and consists conventionally of two oppositely but parallel connected thyristors functioning as electric switches and a following connected transformer. The feed unit 2 is, in turn, supplied with alternating current from source terminals R, S by way of an electrically controlled main switch 4. The measured, i.e. the instantaneous value of the control signals corresponding respectively to filter current and filter voltage are taken from terminals 5 to 7. A signal proportional to instantaneous filter voltage (D.C.) is taken off terminals 6 and 7 via a potentiometer 7a connected across the D.C. output of rectifier 3. A signal proportional to instantaneous filter current is taken off terminals 5 and 6 which are connected across a resistance 6a inserted in the feed connection between the output of rectifier 3 and the filter 1.

The improved regulating system comprises an evaluating circuit which derives the required control quantities for the regulator proper from the measured, i.e. instantaneous values of the filter operating quantities, i.e. voltage and current. The evaluating circuit includes a measured value transformator 8 which receives at its input terminals 10 a voltage proportional to the filter voltage and which is taken out from terminals 6 and 7 adjacent the filter. Transformator 8 develops a push-pull ± output signal at terminals 9a, 9b. The negative output signal from output terminal 9a of the transformer is applied to a first integrator circuit 11 which has a time-constant of 1000 milliseconds (ms.). The positive output signal from terminal 9b is applied by way of a double output diode type gate 12 to the inputs of a second and a third integrator circuit 13, 14 which have time constants of 20 and 40 ms. respectively. A fourth integrator circuit 15, with a time constant of 20 ms., has applied to its input terminals 16 a signal proportional to the filter current which is taken off from terminals 5 and 6 at the filter.

The output from integrator 11 is applied directly to a triple output diode type gate 17; the output from integrator 13 is applied directly to a double output diode type gate 18; the output from integrator 14 is applied as one input to a comparator circuit 20; and the output from integrator 15 is applied as one input to another comparator circuit 21. The other input to comparator circuit 19 is constituted by one output from gate 17; the other input to comparator circuit 20 is constituted by another output from gate 17; and the other input to comparator circuit 21 is constituted by one output from gate 18.

Thus, the output from the comparator circuit 19 is a mixed signal formed from the respective outputs of integrators 11 and 13; the output from comparator circuit 20 is also a mixed signal formed from the outputs of integrators 11 and 14; and the output from comparator circuit 21 is also a mixed signal formed from the outputs of integrators 13 and 15.

The mixed signal output from comparator circuit 19 feeds through a Schmitt trigger 22 and over a "one-shot" or monostable multivibrator unit 23 and one set of contacts 35a of a control switch 35 to one input of a comparator circuit 24 in which it is mixed with a nominal value signal of the regulating device obtained from a tap on potentiometer 25. The mixed signal output from comparator 24 is applied as one input to a further comparator circuit 26 where it is mixed with one output from diode gate 17 which is passed through another set of contacts 35b on switch 35. The input to comparator circuit 26 from diode gate 17 and switch contacts 35b is a measure of the actual, or instantaneous value for the regulating device. The mixed signal output from comparator circuit 26 is passed to a first regulator stage 33 which consists of a push-pull amplifier with "PI" behavior.

Switch 35 is provided to change over from automatic to manual operation. Switch contacts 35a and 35b when opened interrupt the signal input representing the nominal and actual values to the first regulator stage 33, and switch contacts 35c when interrupted by opening of the switch 35 serve to switch the time constant of the first regulator stage 33 to a lower value.

The mixed signal output from comparator circuit 20 is connected to the input side of a Schmitt trigger 27 and the output side of the latter is connected through a diode gate 29 and through a one-shot 30 whose output is connected to the input side of amplifier 31. The output of amplifier 31 is passed to and has an influence upon the first regulator stage 33. The signal after passing through the one-shot 30 is also applied to the input side of another amplifier 32 whose output is connected to, and has an influence upon a second regulator stage 34 which is connected in cascade with the output of the first regulator stage 33. The output of regulator stage 34 is applied to the feed unit 2. This second regulator stage 34 consists of a grid control set which operates according to the phase cutting method and which, depending upon the height of the signal fed to it from the first regulator stage 33, emits rectangular pulses of varying lengths, and the lengths of the pulses determine the ignition points of the thyristors in the feed unit 2 which control application of the A.C. input to rectifier 3.

The mixed signal output from the comparator circuit 21 is passed to the input of another Schmitt trigger 28 and one output from the latter is also passed through the gate 29 to the one-shot 30 to function as a control for the latter. Another output from Schmitt trigger 28 is passed to the control winding of switch 4 to control release of this switch to interrupt flow of alternating current from the supply terminals R, S to the feed unit 2.

MODE OF OPERATION

The comparator circuits 19 to 21 are set so high that the output signals emitted by them do not attain the threshold values of their respectively associated Schmitt triggers 22, 27 and 28 during so-called "trouble-free" operation of the electro-filter 1. When a self-quenching arc appears across the applied voltage points of the filter (such as an arc is referred to as a "wiper"), the filter voltage collapses temporarily. This has the result that the output signal from integrator 13 (which has the time constant of 20 ms.) decreases faster in this short time than that of the integrator 11 (time constant 1000 ms.), and in such manner that the mixed signal output from comparator circuit 19 exceeds the response value of Schmitt trigger 22 which in turn causes the triggering of the one-shot 23. During its operating time, the one-shot 23 emits over the closed switch contacts 35a a signal to the input of comparator circuit 24 which serves to reduce the nominal value of the regulating device to a negative value, so that the filter voltage is very rapidly reduced. After the one-shot 23 has swung back, the filter voltage is regulated up again corresponding to the predetermined regulator characteristic until the next "wiper" appears, after which the process repeats itself. In this manner, the filter voltage is always kept slightly below the sparkover voltage.

If a non-quenching arc is formed across the applied voltage points of the filter 1, the filter voltage likewise collapses but this collapse lasts longer than the collapse associated with a "wiper." This has the effect that, on the one hand, as in the case of the "wiper," triggering of the one-shot 23 is released and, on the other hand, the output signal of integrator 14 (time constant 40 ms.) diminishes sufficiently faster than the output signal from integrator 11 (time constant 1000 ms.) as to cause the output signal from comparator circuit 20 to trigger the one-shot 30 by way of Schmitt trigger 27 and gate 29.

During its operating time the one-shot 30 emits over amplifiers 31 and 32 respectively a signal to the regulator stages 33 and 34 which blocks on the one hand in stage 34, the grid impulses of the phase cutting control and, on the other hand, in the stage 33, short circuits the capacity of the RC of the return of the push-pull amplifier. This has the result that the regulating device now works briefly in the manner of a pure "P" regulator, the filter voltage being regulated rapidly towards zero, due to the nominal value signal switching to a negative value. No later than by the end of the operating time of one-shot 30, is the arc at the filter quenched. Because of the complete discharge of the capacity in the return of the push-pull amplifier in regulator stage 33 caused by the short-circuiting, the filter voltage rises only slowly after the one-shot 30 has swung back and thus permits an extensive de-ionization in the filter.

The determination of short-circuits is effected by comparing the output signals of integrators 13 and 15. With a short-circuit in the filter 1, only the output signal from integrator 15 rises, while the output signal from integrator 13 remains zero. This has the effect that the operating time of one-shot 30 is started over comparator circuit 21 and Schmitt trigger 28, on the one hand, and over the diode gate 29 which then releases the same effects as with the appearance of a non-quenching arc, and on the other hand opening of the main switch 4 is started so that the alternating current supply to the feed unit 2 is interrupted.

For regulation of the filter voltage by hand, in which switch 35 is opened, evaluation of the non-quenching arcs and of the filter short-circuits is effected in the same manner as in the case of automatic operation. On the other hand, by opening switch contacts 35a and 35b, the supply of the signal to reduce the nominal and actual values respectively, is interrupted, so that the regulating device is controlled by way of the comparator circuits 24 and 26 from the voltage tapped from potentiometer 25.

I claim:

1. Apparatus for regulating the voltage applied to an electro-filter to maintain the voltage close to the sparkover level comprising a voltage feed unit interposed between said electro-filter and a voltage supply source, means producing a first electrical output proportional to the instantaneous value of the voltage at the electro-filter, a plurality of integrator circuits having different time constants connected to said first electrical output, and a filter voltage regulating device connected to control the output voltage of said feed unit, said filter voltage regulating device being controlled jointly by the output from the integrator circuit having the longest time constant, and by at least one comparator circuit which forms a mixed output from the outputs of the integrator circuit having the longest time constant and another integrator circuit, and by a least one time element connected to the output of said comparator circuit through a threshold value switch which influences during its response time said voltage feed unit in the sense of a correlated specific reduction of the voltage after a correlated interference threshold of the filter-operation has been exceeded.

2. A regulating apparatus as defined in claim 1 wherein said time element controlled by the mixed output from the outputs of the integrator circuits having the longest and shortest time constants effects during its response time a reduction in a nominal value voltage applied to said filter voltage regulating device.

3. A regulating apparatus as defined in claim 1 wherein a time element controlled by the mixed output from the outputs of the integrator circuit having the longest time constant and another integrator circuit having a time constant intermediate the longest and shortest controls during its response time said filter voltage regulating device to reduce the filter voltage towards zero.

4. A regulating apparatus as defined in claim 1 which further includes means producing a second electrical output proportional to the instantaneous value of the current at the electro-filter, a further comparator circuit forming a mixed output from the output of said integrator circuit having the shortest time consant and from the output of another integrator circuit of the same time constant which is supplied by said means which produces said second electrical output, a further threshold value switch connected to receive the mixed output of said further comparator circuit, and switch means controlled by the output of said further threshold value switch and which functions in the event of a short circuit at said electro-filter to disconnect the electrical circuit between said voltage supply source and said voltage feed unit.

References Cited

UNITED STATES PATENTS

| | | | |
|---|---|---|---|
| 2,771,150 | 11/1956 | Welts | 317—157 X |
| 2,841,239 | 7/1958 | Hall et al. | 55—105 |
| 2,943,697 | 7/1960 | Little | 323—89 X |
| 2,992,699 | 7/1961 | Jarvinen | 55—105 |
| 3,114,097 | 12/1963 | Clarke | 321—18 |
| 3,166,705 | 1/1965 | Brandt | 55—105 |
| 3,173,772 | 3/1965 | Gelfand | 55—105 |
| 3,247,451 | 4/1966 | Havck | 323—66 |

FOREIGN PATENTS 248,429  10/1963  Australia.

DENNIS E. TALBERT, Jr., Primary Examiner

U.S. Cl. X.R.

55—139; 323—23, 66